(12) United States Patent
Pacuk et al.

(10) Patent No.: US 11,162,365 B2
(45) Date of Patent: Nov. 2, 2021

(54) APPARATUS AND METHOD FOR INSPECTING AN AIRFOIL PROFILE

(71) Applicant: United Technologies Corporation, Farmington, CT (US)

(72) Inventors: Jonathon T. Pacuk, Rocky Hill, CT (US); Ryan Edward LeBlanc, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 183 days.

(21) Appl. No.: 16/380,492

(22) Filed: Apr. 10, 2019

(65) Prior Publication Data

US 2020/0325778 A1 Oct. 15, 2020

(51) Int. Cl.
*F01D 5/00* (2006.01)
*G01B 5/20* (2006.01)

(52) U.S. Cl.
CPC .............. *F01D 5/005* (2013.01); *G01B 5/205* (2013.01)

(58) Field of Classification Search
CPC ................................ G01B 5/205; F01D 5/005
USPC ................................ 269/252; 33/555, 549
See application file for complete search history.

(56) References Cited

U.S. PATENT DOCUMENTS

| | | | | |
|---|---|---|---|---|
| 1,425,275 A | * | 8/1922 | Paulsen ................... | B25B 5/003 72/457 |
| 2,224,728 A | * | 12/1940 | Gulliksen .............. | G01B 5/068 33/501.02 |
| 2,453,306 A | * | 11/1948 | Davis ..................... | G01B 5/205 33/793 |
| 2,672,690 A | * | 3/1954 | Crook .................... | G01B 5/205 33/24.3 |
| 2,964,850 A | * | 12/1960 | Herman ................. | G01B 5/205 33/552 |
| 3,208,151 A | * | 9/1965 | Rawstron ............. | G01B 11/306 33/533 |
| 3,348,057 A | * | 10/1967 | Burroughs ........... | G01B 11/303 356/141.3 |
| 4,351,115 A | * | 9/1982 | Possati .................. | G01B 7/287 33/533 |
| 4,454,656 A | | 6/1984 | Arrigoni | |
| 4,674,193 A | * | 6/1987 | Wertepny ............... | G01B 5/207 33/550 |

(Continued)

FOREIGN PATENT DOCUMENTS

| | | |
|---|---|---|
| CN | 103753443 B | 6/2015 |
| GB | 763793 A | 12/1956 |

OTHER PUBLICATIONS

European Search Report; Application No. 20167289.6-1010; dated Aug. 6, 2020; 6 pages.

(Continued)

*Primary Examiner* — Jason L Vaughan
(74) *Attorney, Agent, or Firm* — Cantor Colburn LLP

(57) ABSTRACT

Disclosed is an apparatus for inspecting an airfoil, the apparatus having: a pair of opposing walls connected by a base; a pair of chucks, wherein one of the pair of chucks is secured to one of the pair of opposing walls and the other one of the chucks is secured to the other one of the pair of opposing walls; and a profile gauge supported by the pair of opposing walls and configured to move between the pair of chucks.

4 Claims, 4 Drawing Sheets

(56) References Cited

U.S. PATENT DOCUMENTS

| | | | | |
|---|---|---|---|---|
| 5,301,436 | A * | 4/1994 | Johnston | F42B 35/02 33/506 |
| 6,842,995 | B2 * | 1/2005 | Jones | B23Q 3/186 33/549 |
| 6,943,570 | B2 | 9/2005 | Duffy et al. | |
| 7,389,594 | B2 * | 6/2008 | Takahashi | G01B 5/20 33/549 |
| 7,748,134 | B1 * | 7/2010 | Wang | G01B 5/201 33/551 |
| 7,762,004 | B2 * | 7/2010 | Sherlock | F01D 25/285 33/562 |
| 9,228,820 | B2 * | 1/2016 | Huang | G01B 5/285 |

OTHER PUBLICATIONS

Wenyan Tang et al : "A new system for automati c measurement of the three-di mensi onal form of turbi ne bl ades" , M easu rem ent Sci ence and Technology, IOP, Bri stol, GB, vol. 5, No. 9, Sep. 1, 1994 (Sep. 1, 1994), pp. 1042-1047, XP020065764, ISSN: 0957-0233, DOI: 10.1088/0957-0233/5/9/002.

* cited by examiner

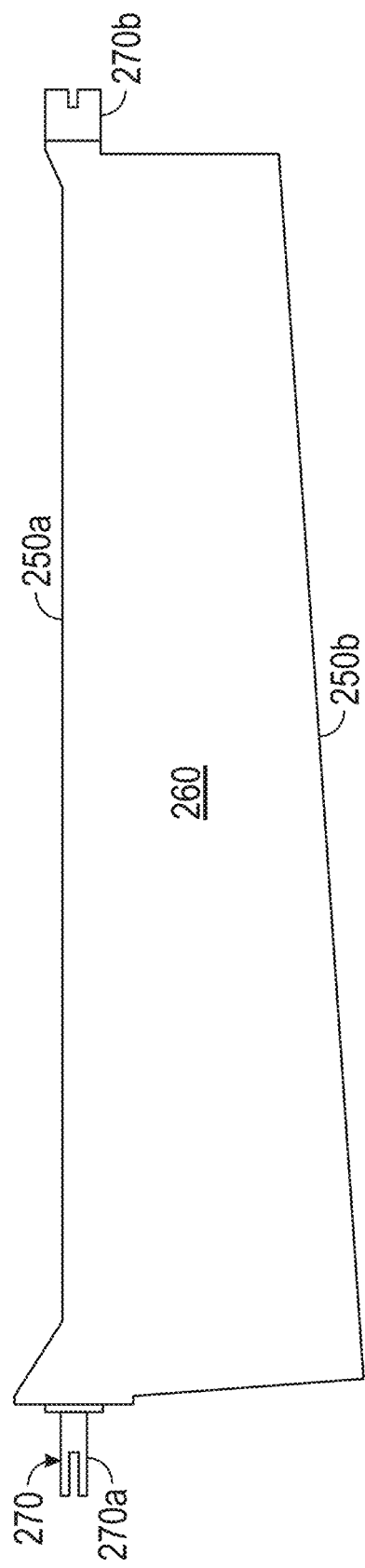

APPARATUS AND METHOD FOR INSPECTING AN AIRFOIL PROFILE

BACKGROUND

The disclosed embodiments relate to an apparatus and method for inspecting an airfoil profile.

During periodic maintenance of a gas turbine engine, airfoils such as fan blades and vanes in a fan inlet case may require replacement. Replacement airfoils should fit in within tight aerodynamic envelops in the engine created by spacing requirements between the airfoil and other structures, such as struts.

BRIEF SUMMARY

Disclosed is an apparatus for inspecting an airfoil, the apparatus comprising: a pair of opposing walls connected by a base; a pair of chucks, wherein one of the pair of chucks is secured to one of the pair of opposing walls and the other one of the chucks is secured to the other one of the pair of opposing walls; and a profile gauge supported by the pair of opposing walls and configured to move between the pair of chucks the profile gauge configured to measure a leading edge profile of the airfoil while moving between the pair of chucks.

In addition to one or more of the above disclosed features or as an alternate the apparatus comprises a rail extending between the pair of opposing walls and supporting the profile gauge above the pair of chucks.

In addition to one or more of the above disclosed features or as an alternate the one of the pair of chucks is configured to move toward the other one of the pair of chucks, and the other one of the pair of chucks is fixed against the other one of the pair of opposing walls.

In addition to one or more of the above disclosed features or as an alternate the one of the pair of chucks is connected to the one of the pair of opposing walls by a threaded rod.

In addition to one or more of the above disclosed features or as an alternate the one of the pair of opposing walls includes a slot to operationally connect with the threaded rod.

In addition to one or more of the above disclosed features or as an alternate one of the pairs of opposing walls has a threaded nut for operationally receiving the threaded rod.

Further disclosed is a combination of an airfoil and an apparatus for inspecting the airfoil; the airfoil including a leading edge and trailing edge and a pair of trunnions extending from opposing ends of the airfoil; and the apparatus comprising: a pair of opposing walls connected by a base; a pair of chucks, wherein one of the pair of chucks is secured to one of the pair of opposing walls and the other one of the chucks is secured to the other one of the one of the pair of opposing walls; and a profile gauge supported by the pair of opposing walls and configured to move between the pair of chucks the profile gauge configured to measure a leading edge profile of the airfoil while moving between the pair of chucks.

In addition to one or more of the above disclosed features or as an alternate the profile gauge includes a probe configured for engaging the leading edge of the airfoil.

Further disclosed is a method of inspecting an airfoil, comprising: securing a pair of trunnions of the airfoil to an apparatus for inspecting the airfoil such that a leading edge is positioned to be inspected by the apparatus; and moving a profile gauge of the apparatus along the leading edge when the airfoil is secured in the apparatus in order to obtain a measured profile of the leading edge for the airfoil.

In addition to one or more of the above disclosed features or as an alternate the method includes positioning a probe of the profile gauge against the leading edge when moving the profile gauge along the leading edge.

In addition to one or more of the above disclosed features or as an alternate the method includes securing the pair of trunnions between a pair of chucks of the apparatus so that one of the pair of chucks engages one of the pair of trunnions and the other one of the pair of chucks engages the other one of the trunnions.

In addition to one or more of the above disclosed features or as an alternate the method includes advancing the one of the pair of chucks toward the other one of the pair of chucks while the other one of the pair of chucks remains stationary.

In addition to one or more of the above disclosed features or as an alternate the method includes rotating a threaded rod of the one of the pair of chucks within a slot of the apparatus.

In addition to one or more of the above disclosed features or as an alternate the method includes comparing the measured profile for the airfoil with a measured profile of another airfoil to determine if the measured profile for the another airfoil is within a predetermined tolerance.

In addition to one or more of the above disclosed features or as an alternate the method includes determining to replace the airfoil with the another airfoil upon comparing the measured profile for the airfoil with a measured profile of another airfoil and determining that the measured profile for the another airfoil is within a predetermined tolerance.

BRIEF DESCRIPTION OF THE DRAWINGS

The following descriptions should not be considered limiting in any way. With reference to the accompanying drawings, like elements are numbered alike:

FIG. 4 is an airfoil having an edge profile that may be measured with an apparatus for inspecting an airfoil according to an embodiment.

DETAILED DESCRIPTION

Figure 1:
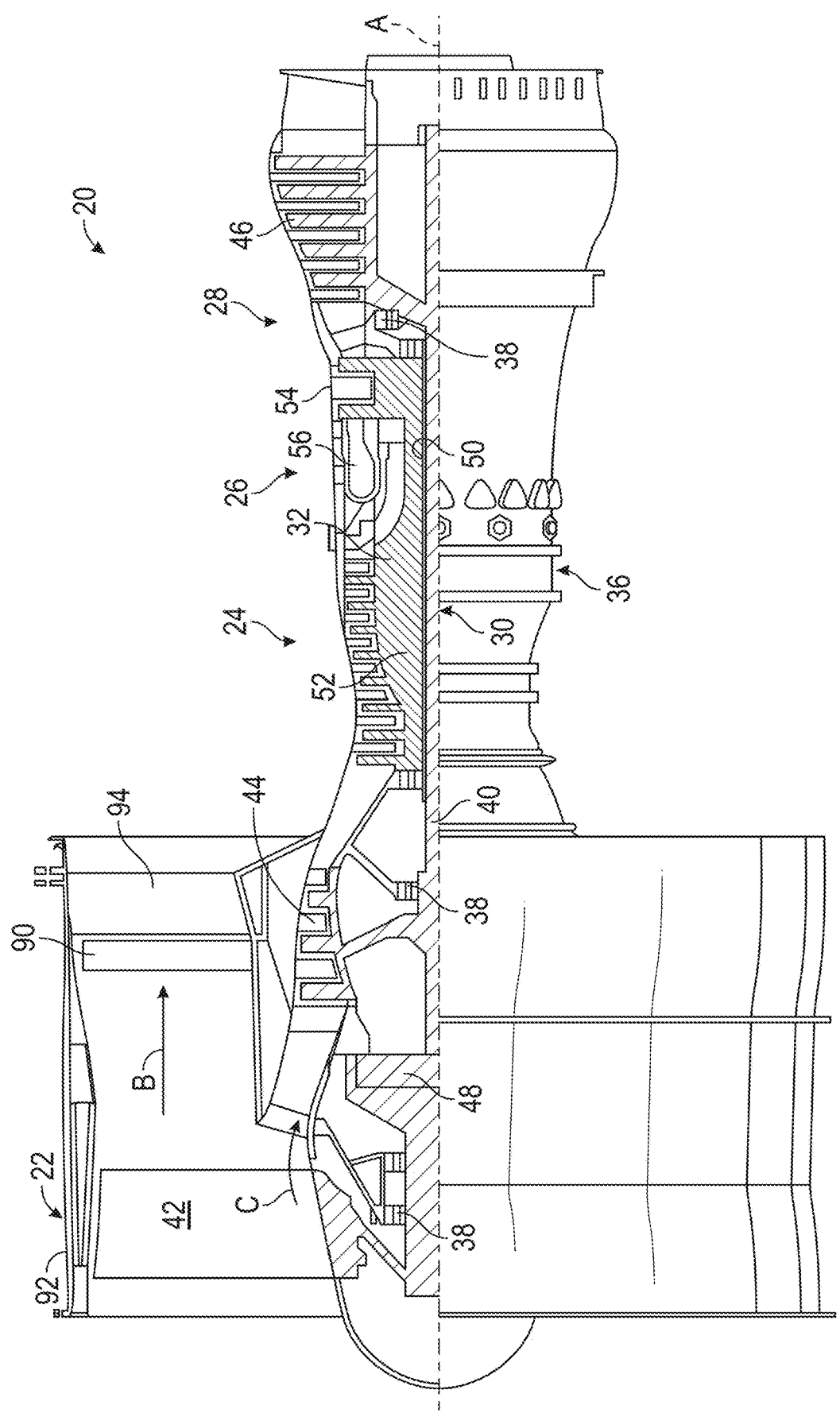
FIG. 1 is a partial cross sectional view of a gas turbine engine according to an embodiment.

A detailed description of one or more embodiments of the disclosed apparatus and method are presented herein by way of exemplification and not limitation with reference to the FIGS. 1.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

When a current fan inlet variable vane 90 (illustrated schematically in FIG. 1) is replaced during scheduled maintenance, profile features of the current vane should be measured to confirm an exact match with a replacement vane. Such confirmation assures that the vane will fit in a tight aerodynamic envelop within a fan inlet case 92, between the vane and an adjacent strut 94.

Figure 2:
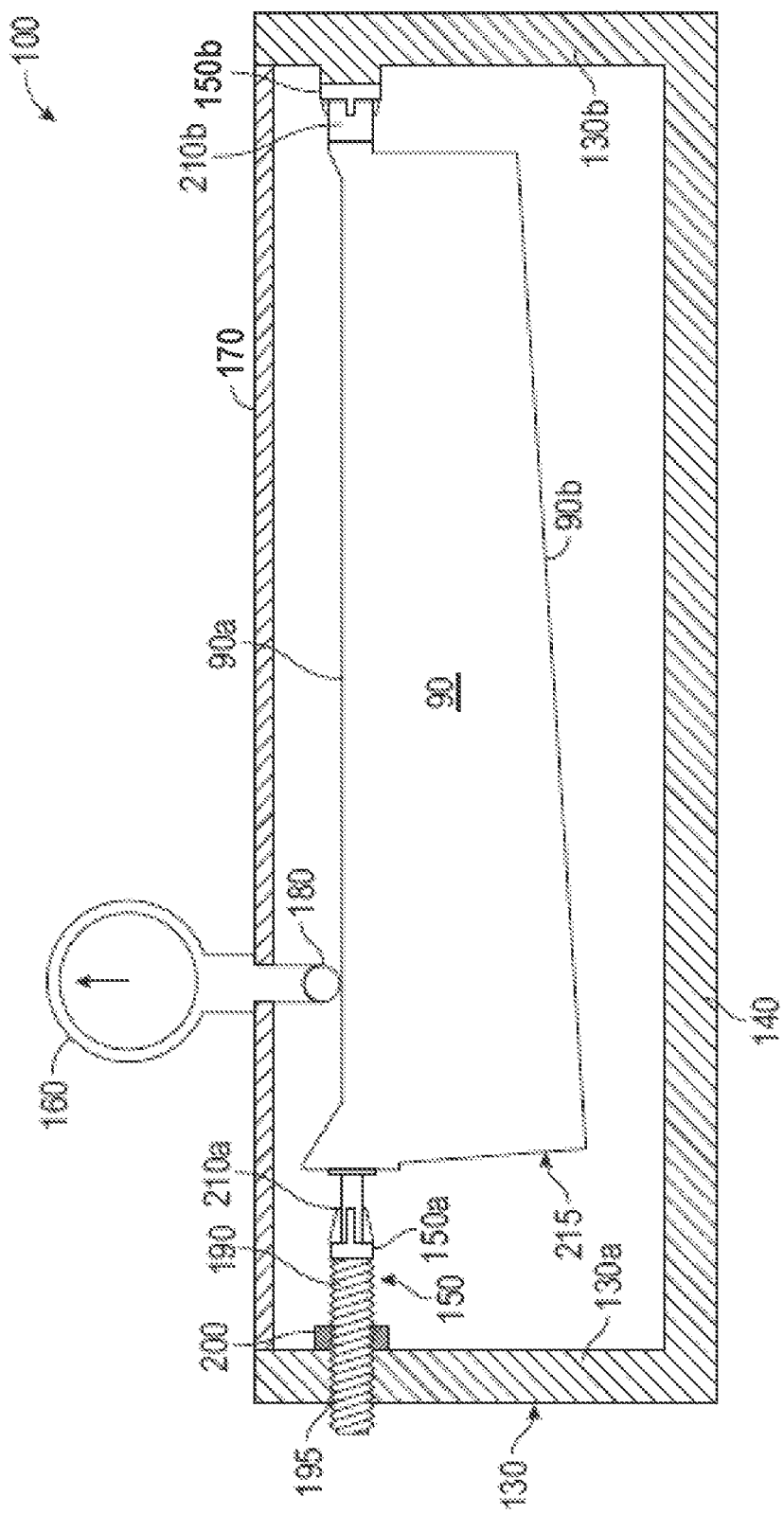
FIG. 2 is an apparatus for inspecting an airfoil with an airfoil secured thereto.

Turning to FIG. 2, disclosed is a fixture or apparatus 100 for inspecting a profile of an airfoil 90, which may be a vane. The apparatus 100 includes a pair of opposing walls 130 connected by a base 140. A pair of chucks 150 is provided in the apparatus 100. One of the pair of chucks 150a is secured to one of the pair of opposing walls 130a. The other one of the chucks 150b is secured to the other one of the pair of opposing walls 130b. A profile gauge 160, which may be calibrated, is supported by the pair of opposing walls 130 and configured to move between the pair of chucks 150. A rail 170, which may be precision machined, extends between the pair of opposing walls 130 and supports the profile gauge 160 above the pair of chucks 150. The profile gauge 160 includes a probe 180 configured for engaging a leading edge 90a of an airfoil 90 secured in the apparatus 100.

For securing the airfoil 90, one of the pair of chucks 150a is configured to move toward the other one of the pair of chucks 150b. The other one of the pair of chucks 150b is fixed against the other one of the pair of opposing walls 130b. The one of the pair of chucks 150a is connected to the one of the pair of opposing walls 130a by a threaded rod 190. The one of the pair of opposing walls 130a includes a slot 200, which may be threaded, to operationally connect with the threaded rod 190. In one embodiment the slot 200 may be a threaded nut. The one of the pair of opposing walls 130a may include a hole 195 aligned with the slot 200 so that the threaded rod 190 may pass through the one of the pair of opposing walls 130 when retracting and advancing the threaded rod 190.

Figure 3:
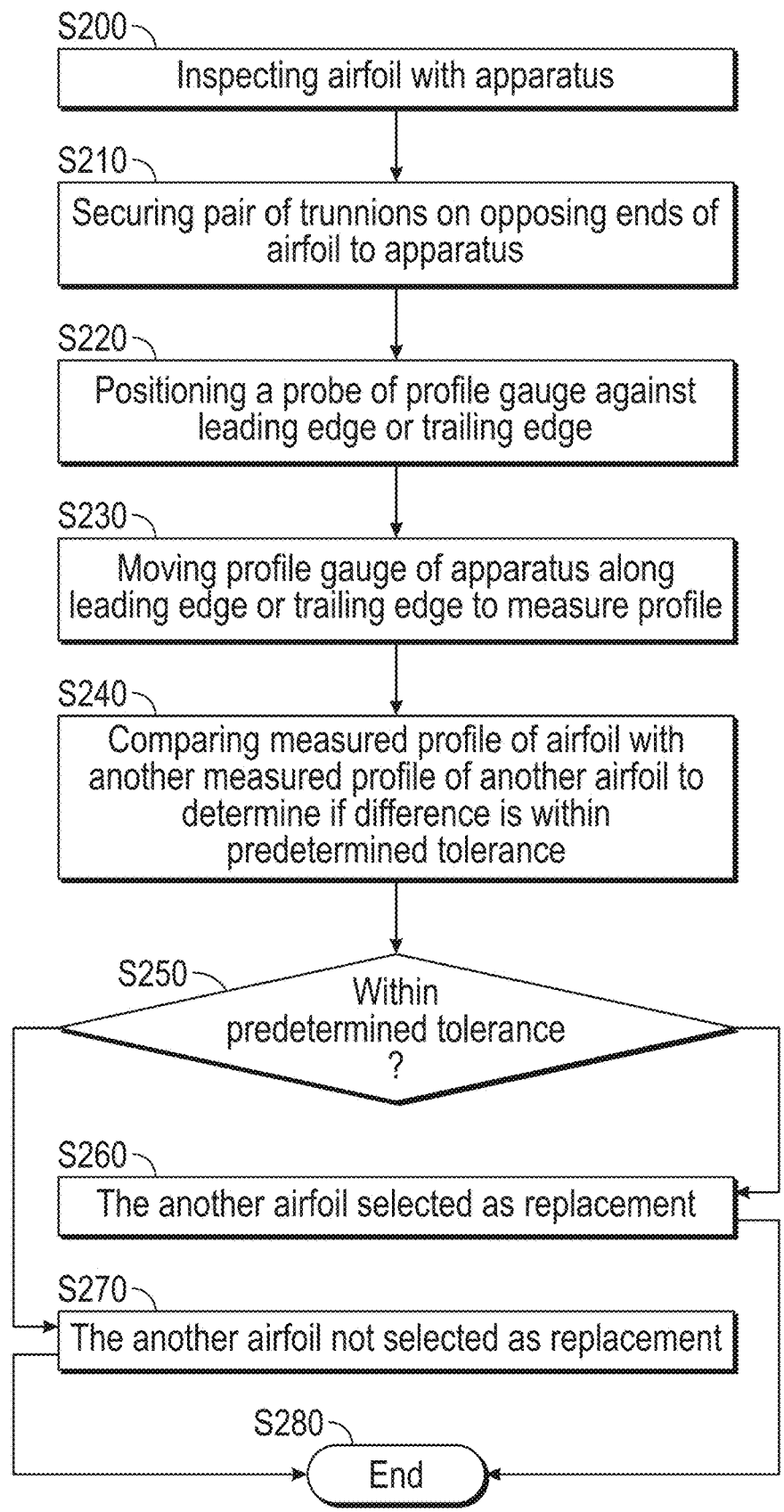
FIG. 3 is a process for inspecting an airfoil with an apparatus.

Disclosed in FIG. 3 is a method or process S200 of inspecting the airfoil 90, which may be a vane, with the apparatus 100. The process includes step S210 of securing a pair of trunnions 210 on opposing ends 215 of the airfoil 90 to the apparatus 100 such that the leading edge 90a of the airfoil 90 is positioned to be inspected by the apparatus 100. The pair of trunnions 210 form the axis of rotation, also referred to as the radial axis, of the airfoil 90. One of the pair of trunnions 210a is an inner diameter (ID) trunnion and the other one of the pair of trunnions 210b is an outer diameter (OD) trunnion.

The pair of trunnions 210 are secured between the pair of chucks 150 of the apparatus 100 by advancing one of the pair of chucks 150a toward the other one of the pair of chucks 150b while the other one of the pair of chucks 150b remains stationary. To advance the one of the pair of chucks 150*a*, the threaded rod 190 of the one of the pair of chucks 150*a* is rotated within the slot 200 of the apparatus 100. From this, one of the pair of chucks 150*a* engages one of the pair of trunnions 210*a* and the other one of the pair of chucks 150*b* engages the other one of the trunnions 210*b*.

Step S220 includes positioning a probe 180 of the profile gauge 160 against the leading edge 90*a* of the airfoil 90 secured in the apparatus 100. Step S230 includes moving the profile gauge 160 of the apparatus 100 along the leading edge 90*a* of the airfoil 90 in order to obtain a measured profile of the leading edge 90*a*. Step S240 includes comparing the measured profile of the airfoil 90 with another measured profile of a leading edge 250*a* of another airfoil 260 (FIG. 4), which may be another vane, to determine if the another measured profile is within a predetermined tolerance. For example, if the airfoil 90 is a vane for the fan inlet case 92, as the airfoil 90 being measured fits in the inlet case 92, the another airfoil 260 (replacement another vane) will also fit in the inlet case 92 if the another measured profile 350 is within the predetermined tolerance. That is, as the airfoil 90 was confirmed to create an acceptable gap relative to an adjacent strut 94 in the fan inlet case 92 at a time of assembly, there is confidence that a gap created between the another airfoil 260 and the adjacent strut 94 will also be acceptable.

It is to be appreciated that the another measured profile for the another airfoil 260 may be obtained by the same process of obtaining the measured profile disclosed above for the vane being measured. For example, the another measured profile may be obtained by securing a pair of trunnions 270, including a first trunnion 270*a* and a second trunnion 270*b* of the another airfoil 260 to the apparatus 100 and obtaining the another measured profile with the profile gauge 160.

At step S250 a decision is made based on whether the another measured profile is within the predetermined tolerance. If the another measured profile is within the predetermined tolerance, then at step S260 the another airfoil may be selected to replace the airfoil 90. Otherwise, at step S270 the another airfoil is not selected to replace the airfoil 90. Step S280 ends the process that initiated at step S200.

The above disclosed embodiments may enable an evaluation of contours of an airfoil 90 such as a vane in a fan inlet case 92 to identify a replacement airfoil with similar contours. As the airfoil 90 being measured fits in the fan inlet case 92, the replacement airfoil will also fit in the fan inlet case 92. That is, as the vane was confirmed to create an acceptable gap relative to an adjacent strut 94 in the inlet case 92 at a time of assembly, there is confidence that a gap created between the replacement airfoil and the adjacent strut 94 will also be acceptable. Thus, the disclosed apparatus 100 and process may reduce an inspection time for replacing an airfoil 90.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An apparatus configured to receive an airfoil, wherein:
the airfoil defines a leading edge, a trailing edge and opposing ends, and the apparatus is configured for inspecting the leading edge of the airfoil; and the apparatus comprises:
a pair of opposing walls connected by a base;
a pair of chucks, wherein one of the pair of chucks is secured to one of the pair of opposing walls and the other one of the chucks is secured to the other one of the pair of opposing walls;
wherein the one of the pair of chucks is configured to move toward the other one of the pair of chucks, and the other one of the pair of chucks is fixed against the other one of the pair of opposing walls, for securing a pair of trunnions that are secured to the opposing ends of the airfoil between the pair of chucks of the apparatus, so that one of the pair of chucks engages one of the pair of trunnions and the other one of the pair of chucks engages the other one of the trunnions, such that the leading edge of the airfoil is positioned to be inspected by the apparatus; and
a profile gauge supported by the pair of opposing walls and configured to move between the pair of chucks, the profile gauge configured to measure the leading edge profile of the airfoil while moving between the pair of chucks, while the airfoil remains stationary within the apparatus; and
a rail extending between the pair of opposing walls, above the chucks, and supporting the profile gauge above the pair of chucks, so that the profile gauge is supported above the leading edge of the airfoil when moving between the pair of chucks and measuring the leading edge profile of the airfoil.

2. The apparatus of claim 1, wherein the one of the pair of chucks is connected to the one of the pair of opposing walls by a threaded rod.

3. The apparatus of claim 2, wherein the one of the pair of opposing walls includes a slot to operationally connect with the threaded rod.

4. The apparatus of claim 3, wherein one of the pairs of opposing walls has a threaded nut for operationally receiving the threaded rod.

* * * * *